United States Patent [19]
Watson et al.

[11] Patent Number: 5,351,564
[45] Date of Patent: Oct. 4, 1994

[54] PIPELINE INSPECTION VEHICLE

[75] Inventors: Kenneth Watson, North Shields; Roger P. Ashworth, Forest Hall, both of United Kingdom

[73] Assignee: British Gas plc, England

[21] Appl. No.: 908,258

[22] Filed: Jul. 6, 1992

[30] Foreign Application Priority Data

Jul. 19, 1991 [GB] United Kingdom ............... 9115668

[51] Int. Cl.⁵ .................... G01M 3/08; B08B 9/04; G01N 27/83; G01R 33/12
[52] U.S. Cl. .................... 73/865.8; 15/104.061; 73/40.5 R; 73/49.1; 324/221
[58] Field of Search .............. 73/40.5, 49.1, 865.8; 15/104.061; 324/221

[56] References Cited

U.S. PATENT DOCUMENTS

| | | | |
|---|---|---|---|
| 957,051 | 5/1910 | Greenan et al. | 15/104.061 |
| 1,620,788 | 3/1927 | Thompson et al. | 15/104.061 |
| 1,898,074 | 2/1933 | Bailey | 15/104.061 |
| 2,972,156 | 2/1961 | Ver Nooy | 15/104.061 |
| 2,975,637 | 3/1961 | Burdick | 73/40.5 |
| 3,162,505 | 12/1964 | Hall | 73/40.5 |
| 3,449,662 | 6/1969 | Wood | 324/37 |
| 3,483,734 | 12/1969 | Wood | 73/40.5 |
| 3,525,111 | 8/1970 | Von Arx | 15/104.061 |
| 3,754,275 | 8/1973 | Carter et al. | 73/40.5 |
| 3,786,684 | 1/1974 | Wiers et al. | 324/37 |
| 3,837,214 | 9/1974 | Guest | 73/40.5 |
| 4,494,584 | 1/1985 | Rognoni | 15/104.061 |

FOREIGN PATENT DOCUMENTS 1312229 4/1973 United Kingdom .
1535252 12/1978 United Kingdom .

Primary Examiner—Hezron E. Williams
Assistant Examiner—George M. Dombroske
Attorney, Agent, or Firm—Larson and Taylor

[57] ABSTRACT

A pipeline inspection vehicle comprises a body 18, an electromagnet 20 for generating magnetic flux, and two foil packs 24, 26 for conducting the flux into and out of the pipewall 10. An array of defect sensors is arranged around the body 18, each sensor being mounted on a respective assembly 28. Each assembly 28 comprises a steel sledge 40 which runs along the pipewall and which is secured to a sensor housing 42. A length of belting 44 is sandwiched between the two and end portions form a leading member 46 and a trailing member 48 linking the sledge to the vehicle. Each assembly 28 is positioned against a spring 64 which is also positioned against the vehicle. The assembly collapses out of the way when the vehicle traverses a sharp bend and the foil pack 24 is deflected to the right. The two members 46 and 48 both counteract the force of the spring 64 when the sledge crosses a void in the pipewall. However, only the leading member 46 is effective during normal running of the sledge along the pipewall to transfer the motion of the vehicle to the sledge.

16 Claims, 3 Drawing Sheets

PIPELINE INSPECTION VEHICLE

FIELD OF THE INVENTION

The invention relates to pipeline inspection vehicles.

BACKGROUND OF THE INVENTION

The invention is described in terms of a vehicle which inspects ductile iron gas distribution pipelines, the vehicle being towed through the pipeline by means of a flexible member, such as a cable, attached to a winch. However, the invention is applicable quite generally and includes vehicles for use in inspecting gas or oil transmission pipelines, or pipelines for conveying water or other liquids which in most cases are propelled through the pipeline by a pressure difference across the vehicle owing to the pressure difference applied to drive the fluid through the pipeline.

British patent specification No. GB-B-1535252 describes a pipeline inspection vehicle for inspecting gas transmission lines. The vehicle has an array of sensor mountings arranged around the body of the vehicle. Each sensor is mounted on a metal plate or sledge adapted to run along the inside surface of the pipeline to be inspected. The leading end of the plate is connected by a flexible member to an anchorage on the vehicle. A metal spring also mounted on an anchorage on the vehicle has two spring arms, the first of which bears against the flexible member and the second of which bears against the trailing end of the plate.

Thus, the plate is urged towards the pipeline by spring forces applied at its ends.

SUMMARY OF THE INVENTION

The object of the invention is to provide an inspection vehicle in which the spring of each defect sensor exerts on the respective sledge substantially only a force normal to the pipe wall.

A pipeline inspection vehicle, according to the invention, detects defects in the wall of the pipeline and comprises a body, two spaced apart flux conductors for engaging the inside of the pipeline, and means for generating flux either electromagnetically or by permanent magnetism, said flux being capable of circulating in a path including said wall, one of said conductors, said body or return path members secured to said body and the other of said conductors, and an array of defect sensors arranged around the vehicle between said conductors, each sensor being mounted on a respective assembly which comprises a housing for the sensor, a sledge secured to the housing, a leading member and a trailing member extending from the sledge to respective anchorages which are spaced apart along a surface opposed to the housing, and are separated by a greater distance than the length of the sledge, and a spring which is positioned between the members against the sensor housing and against said surface, said members being inextensible and each being readily collapsible under forces tending to make its ends become closer.

Preferably each member comprises belting made of polymeric fibres.

Preferably, each said spring is made of non-metallic elastomeric material.

BRIEF DESCRIPTION OF THE DRAWINGS

Embodiments of the invention will now be described by way of example with reference to the accompanying drawings.

DESCRIPTION OF THE PREFERRED EMBODIMENTS

The drawings show part of a pipeline inspection vehicle for inspecting ductile cast iron gas distribution pipelines, in this case 12" pipelines (i.e. pipelines having nominally a 12", 300 millimeter inside diameter). The invention is applicable to vehicles for inspecting different sized pipelines, e.g. 6" and 8" gas distribution pipelines, and also steel gas transmission lines having inside diameters of, say, 6" and above. The invention is also applicable to vehicles for inspecting non-gas pipelines, such as steel water or oil or other pipelines, for example.

In this example, the pipeline is inspected while it is "dead" i.e. without any gas being present in it and the vehicle is intended to be pulled through the pipeline by a cable attached to a winch. In transmission lines, the vehicle would normally be equipped with cups engaging the pipe wall and the vehicle would be propelled by a difference in pressure (developed across the cups) in the product being conveyed by the pipeline.

Other drive options which are possible include the use of a tethered vehicle driven by drive cups engaging the pipe wall (e.g. the vehicle could be tethered by the umbilical cable). The pressure difference across the cups may be due to air blown along the pipe, in the inspection of "dead" pipelines, or where the pressure would be high enough the pressure difference across the cups could be due to gas moving in the pipeline as in medium pressure (and higher) distribution lines; also included is the use of a tractor vehicle to pull the inspection vehicle or to have inspection facilities included in the tractor vehicle. A tractor vehicle is usable in gas distribution lines, gas transmission lines, and water or oil or other lines.

Figure 1:
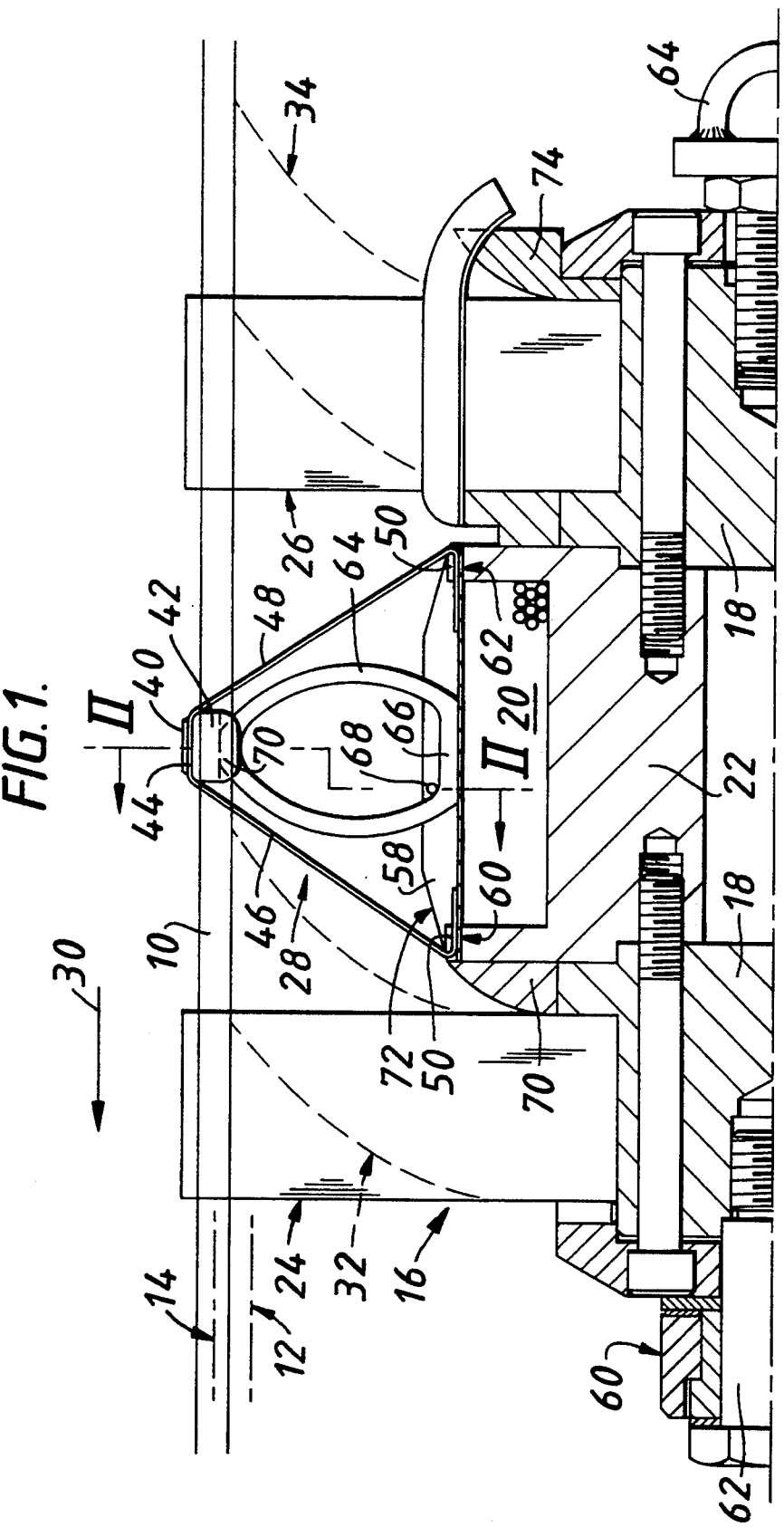
FIG. 1 is a longitudinal vertical cross-section through the upper part of a first embodiment of pipeline inspection vehicle.
Figure 2:
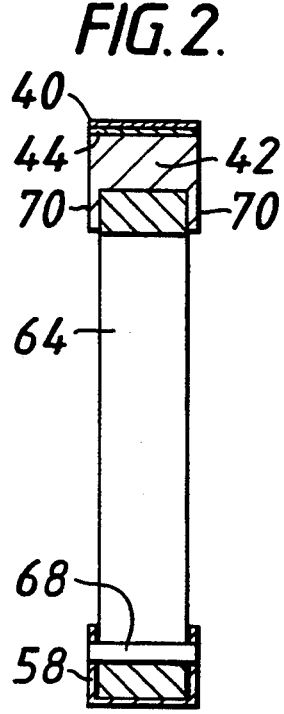
FIG. 2 is a scrap vertical end-elevation through the spring of the defect sensor shown in FIG. 1 on the line II—II in FIG. 1.

In FIG. 1, the minimum bore of the pipeline 10 is shown at 12 and the maximum bore of the pipeline 10 is shown at 14. The pipeline 10 is made of ductile cast iron and the bore varies between the maximum and minimum values shown.

The vehicle 16 consists of the following main components: a body 18; an electro-magnetic coil 20 wound on a former 22; packs of foils 24, 26; and thirty-six assemblies 28 (only one of which is shown) equiangularly arranged around the body 18 of the vehicle 16.

Figure 4:
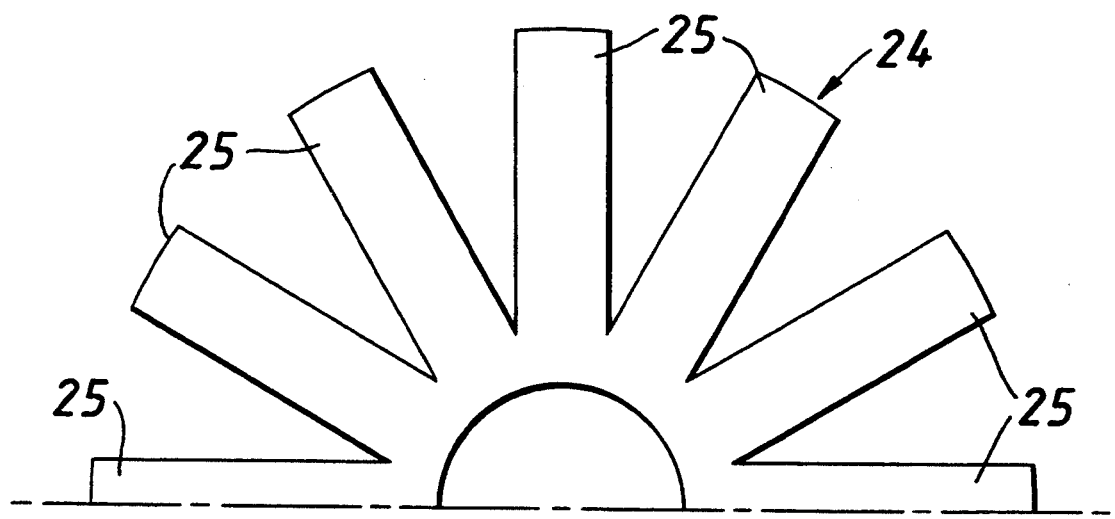
FIG. 4 is a front view of the front foil pack.

Each pack of foils 24, 26 is made up of a number of foils each having the shape shown in FIG. 4. This shape preferably comprises twelve fingers 25.

For different sizes of vehicle there may be different numbers of fingers. For example, the six inch vehicle may have packs of foils in which each foil has nine fingers. The eight-inch vehicle has twelve fingers per foil, as in the present case. In the case of the six-inch vehicle eighteen sensors are preferred and in the case of the eight-inch vehicle, twenty-four sensors are preferred.

In modified vehicles the foils may be replaced by assemblies of bristles. However, in this example the use of foils gives a major advantage in that it allows a smaller occupied volume given the required metal area for adequate flux transmission into the pipe wall. In this specification each of the packs 24, 26 or each of the assemblies of bristles is referred to by the expression "flux conductor". The function of the foils 24, 26 is explained below.

The vehicle in this case runs on the packs of foils without any other suspension component engaging the wall of the pipe. Alternative forms of vehicle may use wheels on the vehicle running along the pipewall in order to support all, or some of the weight of the vehicle. The wheels may be displaceable relative to the body against springs. Instead of, or in addition to, wheels the weight of the vehicle may be partly or wholly supported on the drive cups referred to above.

Each assembly 28 comprises an austenitic stainless steel sledge 40 which is secured to a sensor housing 42 with a length of belting 44 sandwiched between the two. The end portions of the belting 44 form a leading member 46 and a trailing member 48 which link the leading and trailing ends, respectively, of the sledge 40 to the vehicle. The belting 44 is made of polyurethane coated polyester fibres and is substantially inextensible.

Figure 3:
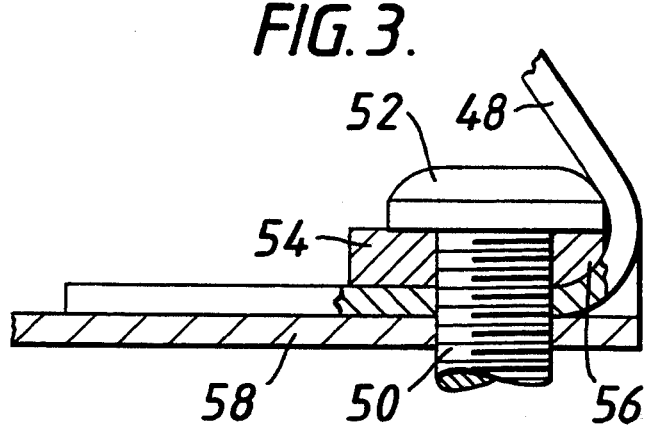
FIG. 3 is a scrap longitudinal vertical section through part of the defect sensor shown in FIG. 1.

The ends of the members 46, 48 are each held by a screw 50 (FIG. 3) which has a rounded head 52 and retains a washer 54 having a rounded edge portion 56 against the belting 46 or 48. The screw 50 retains the member 46 or 48 against a stainless steel pressing 58 forming a base plate, itself retained in position on the outer edges 60, 62 of the former 22.

The assembly 28 is positioned against a spring 64, which is also positioned against the vehicle, or rather against the respective pressing or base plate 58. The spring 64 is approximately of 0 form and is made of polyurethane elastomeric material. The spring 64 has a flattened shape at 66 where it engages the base plate 58. The spring 64 is retained in position against the base plate 58 by a pin 68 which engages holes in the sides of the plate 58, which is of U-section. The spring 64 is retained at its opposite end by ears 70 formed on the sensor housing 42, the ears 70 extending one on each side of the spring 64 to retain it against sideways displacement normal to the plane of the spring 64.

The inspection vehicle 16 is shown in the condition which applies to the vehicle before it is inserted in the pipeline. Assuming the vehicle is intended to move in the direction of the arrow 30 shown in FIG. 1, when the vehicle 16 is inserted in the pipeline the foil packs 24, 26 would be deflected to the right so as to curve as indicated by the ghost outlines at 32 and 34.

The assemblies 28 would also be deformed and while the vehicle 16 is stationary in the pipeline, the members 46, 48 are slack and only the spring 64 is effective to exert a force on the sledge 40 which is substantially normal to the wall of the pipeline.

When the vehicle 16 moves (say in the direction of the arrow 30 shown in FIG. 1) the leading member 46 becomes taut and the motion of the vehicle is transmitted to sledge 40 by the member 16. The trailing member 48 becomes slack and does not play any part in the control of the assembly 28 so long as the sledge 40 runs along the inside of the pipewall.

When the sledge 40 travels across a void in the pipework (for example where a branch pipe joins the pipeline) the sledge 40 moves radially outwardly and both leading and trailing members 46, 48 act to exert inwardly directed forces on the sledge 40 to counteract the outward force of the spring 64.

The vehicle 16 is designed to travel backwards, should it prove impossible to move it forward. In that case, the roles of the members 46, 48 are reversed. The foil packs 24, 26 would be deformed in the opposite sense, curving towards the left instead of towards the right.

Figure 5:
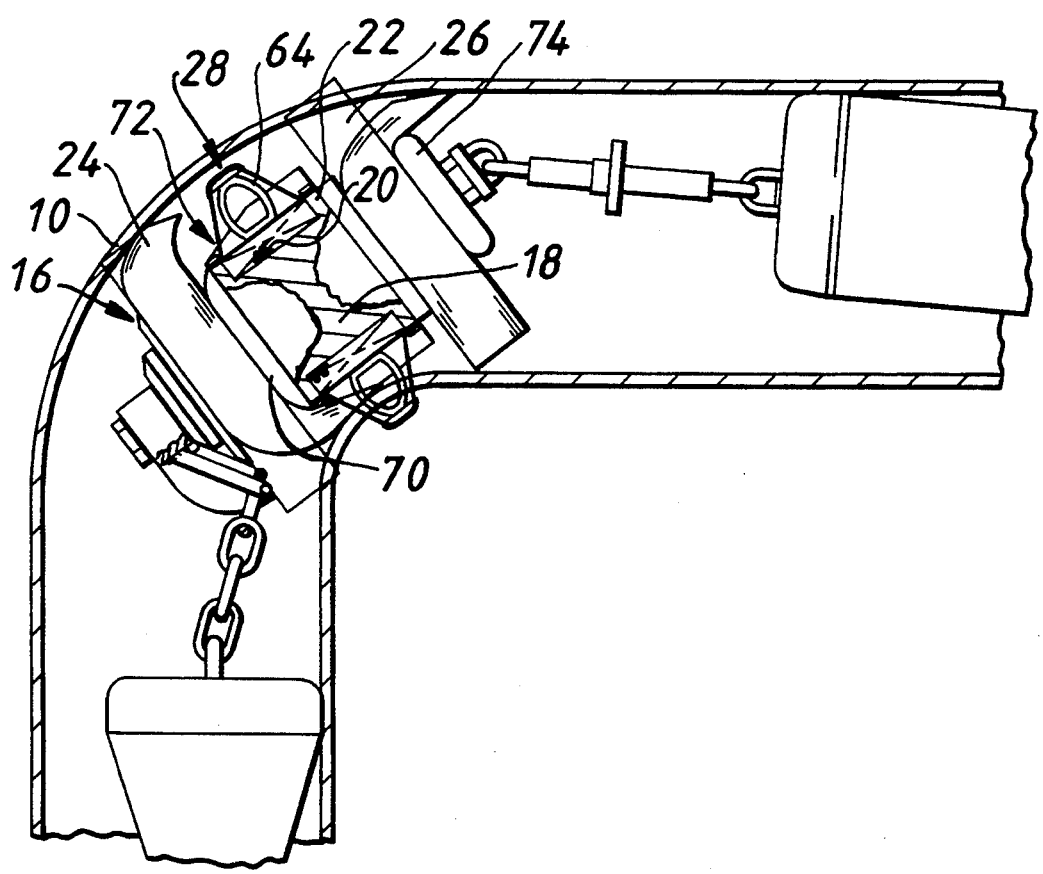
FIG. 5 shows a second embodiment of vehicle.

Each assembly 28 must accommodate variations in the bore of the pipeline 10 and side-to-side motion of the vehicle within the pipeline. Furthermore, the vehicle is required to negotiate bends in the pipeline. Such bends may be as tight as one diameter, that is the radius of curvature of the bend (measured to the pipe centre) is equal to the internal diameter of the bend. Such a bend is especially severe in the case of 6" pipe. This is shown in FIG. 5 in which a 6" vehicle is shown negotiating a one diameter bend in a distribution pipeline. The assembly 28 at the inside of the bend is shown in the condition it has when the vehicle is outside the pipeline, however. In negotiating such a bend the sensor assembly 28 at the inside of the bend is required to collapse completely. This is possible owing to the nature of the leading and trailing members 46, 48. Under such conditions, the foil pack 24 at the inside of the bend would be required to be deflected right over until the rearmost foil lay against the stop 70 (shown in FIGS. 1 and 5) carried by the vehicle body 18, and against the upper edge 72, of the wings of the pressing 58. The foil pack 26 would be heavily deformed, adjacent to the outer wall of the pipeline, and the rearmost foil would conform to the stop 74 (shown in FIG. 1 and 5) carried by the vehicle body 18.

Under certain conditions, the spring 64 might engage the leading member 46 and the trailing member 48.

For example, the size of the pipe might demand a spring of such characteristics that the spring occupies nearly the whole of the space between the leading member 46 and the trailing member 48. Under running conditions in the pipeline 10 the spring 64 might cause the leading member 46 to bow outwards.

However, even under such conditions the spring still exerts a force on the sledge 40 which is substantially normal to the pipewall. Also, the motion of the vehicle is still transmitted to the sledge 40 by the leading member 46 notwithstanding its bowed shape.

As shown, the vehicle 16 is intended normally to travel in the direction of the arrow 30 shown in FIG. 1, being pulled by a haulage cable (not shown) attached to a swivel assembly 60 mounted on a pin 62 secured to the leading end of the body 18. Another haulage cable (not shogun) for retrieving the vehicle 16 in reverse is attached to the eye 64 secured to the trailing end of the body 18.

The inspection is carried out using the flux leakage method. A powerful magnetic field is generated by the electromagnetic coil 20 and transferred into, and out of, the wall of the pipeline 10 by the foil packs 24, 26. Electric current to energise the electromagnetic coil 20 is supplied from the surface via an umbilical supply cable (not shown) connected to the coil. Defects, such as loss of metal due to corrosion in the wall of the pipe, cause magnetic flux to leak out of the wall of the pipe and this is detected by the sensor within the housing 42.

Each sensor transmits a continuous signal as the pig moves through the pipeline and this signal, with the signals from the other sensors, is sent down a second umbilical cable (not shown) which extends from the vehicle to a personal computer with a hard disc recording facility at the surface of the ground. The position of the vehicle along the pipeline is known from a monitor measuring the length of haulage cable paid out by the winch.

In some cases (for example where an umbilical supply cable cannot be used) the electromagnetic coil 20 is replaced by a permanent magnet or magnets.

The magnetic flux created by the electromagnet 20 circulates in a path, which includes the wall of the pipeline 10, the flux conductor or foil pack 26, the return path provided by the body 18 and the other foil pack 24 forming the other flux conductor.

In other modifications (not shown) the path may include flux return paths which are formed by members carried by the body, instead of the body itself providing the return path. For example, where permanent magnets are used instead of an electromagnet, the arrangement may be as shown in British patent specification No. GB-B-1535252. In that specification the magnets are flat plates having the magnetic poles at their broad faces and those faces are arranged parallel to the pipe inside surface. The magnets are arranged one at each end of flux return path members arranged around the body. The members are mounted on springs so as to move radially inward and outward to allow changes in diameter of the pipeline to be accommodated. The flux conductors are mounted upon the magnets. The assemblies 28 would in that arrangement be mounted not on the body itself but on a ring which is "floating". That is, the ring surrounds the flux return path members and is connected to them by radial posts which pass through holes in the ring. The ring can thus move radially with respect to the flux return path members as the vehicle negotiates bends.

We claim:

1. A pipeline inspection vehicle for detecting defects in the wall of the pipeline comprising a body, two spaced apart flux conductors for engaging the inside of the pipeline, and means for generating flux either electromagnetically or by permanent magnetism, said flux being capable of circulating in a path, said path comprising said wall, one of said conductors, said body, and an array of defect sensors arranged around the vehicle between said conductors, each sensor being mounted on a respective assembly which comprises a housing for the sensor, a sledge secured to the housing, a leading member and a trailing member extending from the sledge to respective anchorages which are spaced apart along a surface opposed to the housing, and are separated by a greater distance than the length of the sledge, and a spring which is positioned between the leading and trailing members against the sensor housing and against said surface, said leading and trailing members being inextensible and each being readily collapsible under forces tending to make its ends become closer.

2. A vehicle according to claim 1, each of said leading and trailing members comprising belting made of polymeric fibres.

3. A vehicle according to claim 2, wherein said polymeric fibres comprise polyurethane coated fibres, each of said fibres being coated with polyurethane.

4. A vehicle according to claim 1, said spring being made of non-metallic elastomeric material.

5. A vehicle according to claim 4 said spring being made of polyurethane elastomeric material.

6. A vehicle according to claim 4, wherein said spring comprises an 0 form in a side elevational view thereof.

7. A vehicle according to claim 6, the 0 form having a flattened shape where it engages the vehicle.

8. A vehicle according claim 4, wherein the assembly comprises a shape which retains the spring against sideways displacement of the spring normal to the plane of the 0 form.

9. A vehicle according claim 1, wherein the leading and trailing members both linking the assembly to a base and the spring also engaging said base, the base being mounted on part of the vehicle.

10. A vehicle according to claim 1 wherein said spring engages the leading member.

11. A vehicle according to claim 1 wherein each of said leading and trailing members is deformable out of a rectilinear shape.

12. A vehicle according to claim 11 wherein each of said leading and trailing members is deformable to an outwardly bowed shape.

13. A vehicle according to claim 1 wherein one of said leading and trailing members is taut when said vehicle is moving.

14. A vehicle according to claim 1 wherein, when said leading and trailing members are positioned in a pipeline such that when the spring exerts a force normal to the pipe wall and directed towards the pipe, the spring force is counteracted by an inward force applied by the leading member, said force being inclined to the wall of the pipe.

15. A vehicle according to claim 1 wherein the sledge has a length which is shorter than a length of the housing, said sledge being arranged symmetrically with respect to the housing, to prevent the sensor from catching in pipe features when the vehicle is moving.

16. A vehicle according to claim 1 wherein each of the respective assemblies has a shape of a quadrilateral which is symmetrical about a radius of the pipe, said quadrilateral having two opposite side of equal length and two opposite sides of unequal length, a longer of said sides of unequal length being on the vehicle.

* * * * *